US010247463B1

(12) United States Patent
Garcia (10) Patent No.: US 10,247,463 B1
(45) Date of Patent: Apr. 2, 2019

(54) SOLAR-POWERED REFRIGERATING COOLER

(71) Applicant: Miguel Garcia, Kissimmee, FL (US)

(72) Inventor: Miguel Garcia, Kissimmee, FL (US)

( * ) Notice: Subject to any disclaimer, the term of this patent is extended or adjusted under 35 U.S.C. 154(b) by 64 days.

(21) Appl. No.: 15/464,468

(22) Filed: Mar. 21, 2017

(51) Int. Cl.
| F25D 3/06 | (2006.01) |
| F25D 11/00 | (2006.01) |
| F25D 23/12 | (2006.01) |
| H02J 7/35 | (2006.01) |

(52) U.S. Cl.
CPC ............ *F25D 11/003* (2013.01); *F25D 23/12* (2013.01); *H02J 7/35* (2013.01); *F25D 2400/38* (2013.01)

(58) Field of Classification Search
CPC . F25D 3/06; F25D 3/08; F25D 11/003; F25D 23/12; F25D 2400/38; F25B 21/02; F25B 27/00; H02J 7/35
See application file for complete search history.

(56) References Cited

U.S. PATENT DOCUMENTS

| 5,269,157 A * | 12/1993 | Ciminelli | A45B 11/00 280/47.18 |
| 5,373,708 A * | 12/1994 | Dumoulin, Jr. | A45C 5/146 280/30 |
| 5,636,852 A * | 6/1997 | Sistrunk | B62B 1/12 248/156 |
| 6,021,642 A * | 2/2000 | Guinn | A45C 5/005 62/235.1 |
| 6,305,185 B1 | 10/2001 | Sloan | |
| 6,751,963 B2 | 6/2004 | Navedo | |
| 7,481,070 B2 | 1/2009 | Costanzo | |
| D660,885 S | 5/2012 | Crawford | |
| 8,353,167 B2 | 1/2013 | McGann | |
| 9,232,290 B2 | 1/2016 | Beasay | |
| 9,476,638 B1 * | 10/2016 | Tyler | F25D 31/005 |
| 2005/0188715 A1 * | 9/2005 | Aragon | F25D 3/125 62/371 |
| 2009/0025411 A1 * | 1/2009 | Anderson | F25D 11/003 62/235.1 |
| 2015/0176884 A1 | 6/2015 | Grepper | |
| 2016/0153690 A1 * | 6/2016 | Patsis | F25D 3/08 222/608 |

FOREIGN PATENT DOCUMENTS

KR        100750811 B1    8/2007

* cited by examiner

*Primary Examiner* — Melvin Jones
(74) *Attorney, Agent, or Firm* — Kyle A. Fletcher, Esq.

(57) ABSTRACT

The solar-powered refrigerating cooler in an insulated container. The interior space of the solar-powered refrigerating cooler forms a temperature controlled space within which items may be stored. The solar-powered refrigerating cooler comprises a refrigeration system that: 1) forms the interior space; and, 2) cools the interior space of the solar-powered refrigerating cooler. The refrigeration system is solar-powered. The solar-powered refrigerating cooler comprises a refrigeration system, one or more USB ports, a cutting board, a bottle opener, an extendable handle, and a power system. The one or more USB ports, the cutting board, the bottle opener, the extendable handle, and a power system are mounted on the refrigeration system.

18 Claims, 7 Drawing Sheets

SOLAR-POWERED REFRIGERATING COOLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting and heating including refrigeration machines, more specifically, a refrigeration machine using solar power.

SUMMARY OF INVENTION

The solar-powered refrigerating cooler is an insulated container. The interior space of the solar-powered refrigerating cooler forms a temperature controlled space within which items may be stored. The solar-powered refrigerating cooler comprises a refrigeration system that: 1) forms the interior space; and, 2) cools the interior space of the solar-powered refrigerating cooler. The refrigeration system is solar-powered. The solar-powered refrigerating cooler comprises a refrigeration system, one or more USB ports, a cutting board, a bottle opener, an extendable handle, and a power system. The one or more USB ports, the cutting board, the bottle opener, the extendable handle, and a power system are mounted on the refrigeration system.

These together with additional objects, features and advantages of the solar-powered refrigerating cooler will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar-powered refrigerating cooler in detail, it is to be understood that the solar-powered refrigerating cooler is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar-powered refrigerating cooler.

It is therefore important that the claims be regarded as including such equivalent construction insofar as they do not depart from the spirit and scope of the solar-powered refrigerating cooler. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The solar-powered refrigerating cooler 100 (hereinafter invention) is an insulated container. The interior space 161 of the invention 100 forms a temperature controlled space within which items may be stored. The invention 100 comprises a refrigeration system 101 that: 1) forms the interior space 161; and, 2) cools the interior space 161 of the invention 100. The refrigeration system 101 is solar-powered. The invention 100 comprises a refrigeration system 101, one or more USB ports 102, a cutting board 103, a bottle opener 104, an extendable handle 105, and a power system 106. The one or more USB ports 102, the cutting board 103, the bottle opener 104, the extendable handle 105, and a power system 106 are mounted on the refrigeration system 101. The interior space 161 is a contained negative space within the refrigeration system 101 that is temperature controlled by a refrigeration device 114 and that is suitable for use in storing foodstuffs.

The refrigeration system 101 forms the foundation of the invention 100. The refrigeration system 101 is an interior space 161 that further comprises a refrigeration device 114 that actively cools the interior space 161 to a temperature appropriate for the storage of foodstuffs.

The refrigeration system 101 comprises a housing 111, one or more hinges 112, a plurality of wheels 113, and a refrigeration device 114. The refrigeration device 114 further comprises a compressor motor 115.

The housing 111 is a hollow rectangular block structure that is used to form the cooled interior space 161 of the invention 100. Each of the one or more hinges 112 is a readily and commercially available hinge which acts a pivot around which the superior face 141 will rotate. Each of the plurality of wheels 113 is a readily and commercially available wheel.

The refrigeration device 114 is a mechanical implementation of a Carnot cycle which is used to cool the interior space 161 of the invention 100. The compressor motor 115 is an electrically powered pump that used to pressurize a refrigerant that is used by the refrigeration device 114 to implement the Carnot cycle.

The housing 111 contains the interior space 161. The housing 111 is further defined with a superior face 141, an inferior face 142, an anterior face 143, a posterior face 144, a left face 145, and a right face 146.

The superior face 141 is formed as an insulating structure. The superior face 141 forms the superior surface of the invention 100. The superior face 141 rotates like a lid to provide access to the interior space 161 of the refrigeration system 101.

The inferior face 142 is formed as an insulating structure. The inferior face 142 is the face of the housing 111 that: 1) is distal from the superior face 141; and, 2) is proximal to the supporting surface 171. The supporting surface 171 is a horizontal surface upon which the invention 100 is placed. The inferior face 142 is formed with a component space 163. The component space 163 is a rectangular block shaped negative space that is formed within the inferior face 142 for the purpose of storing the refrigeration device 114 and the power system 106.

The anterior face 143 is formed as an insulating structure. The anterior face 143 is the face of the housing 111 that leads the invention 100 when the invention 100 is moved using the plurality of wheels 113. The anterior face 143 is further defined with an interior anterior surface 162. The interior anterior surface 162 is the surface of the anterior face 143 that is proximal to the interior space 161.

The posterior face 144 is formed as an insulating structure. The posterior face 144 is the face of the housing 111 that is distal from the anterior face 143.

The left face 145 is formed as an insulating structure. The left face 145 is the face of the housing 111 that is to the left of a viewer when the anterior face 143 of the housing 111 is directly viewed. The left face 145 further comprises a left handle 151. The left handle 151 is a grip that is formed in the left face 145. The left face 145 is further defined with an interior left surface 164. The interior left surface 164 is the surface of the left face 145 that is proximal to the interior space 161.

The right face 146 is formed as an insulating structure. The right face 146 is the face of the housing 111 that is to the right of a viewer when the anterior face 143 of the housing 111 is directly viewed. The right face 146 further comprises a right handle 152. The right handle 152 is a grip that is formed in the right face 146. The right face 146 is further defined with an interior right surface 165. The interior right surface 165 is the surface of the right face 146 that is proximal to the interior space 161.

The cutting board 103 comprises a polyethylene panel 133 upon which foodstuffs may be placed and cut. The cutting board 103 further comprises an apparatus for storing the polyethylene panel 133. The cutting board 103 comprises a left track 131, a right track 132, a polyethylene panel 133, and a board shelf 134. The left track 131 is a U-shaped bracket that is sized to receive an edge of the polyethylene panel 133. The right track 132 is a U-shaped bracket that is sized to receive an edge of the polyethylene panel 133. The polyethylene panel 133 is a readily and commercially available solid rectangular plate structure that is made from food grade polyethylene that is suitable for the handling of foodstuffs. The board shelf 134 is a rectangular block structure that projects perpendicularly from the interior anterior surface 162 of the anterior face 143.

Each of the one or more USB ports 102 is a type A USB port that provides electricity for use in recharging personal data devices. The bottle opener 104 is a readily and commercially available bottle opener 104 suitable for use in removing caps from capped bottles.

The extendable handle 105 is a readily and commercially available handle. The position of the extendable handle 105 relative to the refrigeration system 101 is adjustable. Methods to design and install an extendable handle 105 are well known and documented in the luggage arts.

The power system 106 is a solar-powered electrical system that is used to power the one or more USB ports 102 and the refrigeration device 114. The power system 106 comprises a photovoltaic cell 121, a battery 122, an electrical ground 123, and a diode 124. The photovoltaic cell 121 is a readily and commercially available electrical device that converts light into electrical energy. The battery 122 is a readily and commercially available battery 122. The diode 124 is a readily and commercially available electrical device.

The assembly of the invention 100 is described in the following 9 paragraphs. The refrigeration device 114 and the power system 106 are contained within the component space 163 of the inferior face 142.

Each of the one or more USB ports 102 is mounted on the exterior surface of the anterior face 143 of the housing 111. The bottle opener 104 is mounted on the exterior surface of the anterior face 143 of the housing 111. The extendable handle 105 is mounted on the exterior surface of the posterior face 144 of the housing 111 such that the extendable handle 105 extends in the superior direction when the invention 100 is resting on a supporting surface 171. Each of the one or more hinges 112 attaches the superior face 141 to the posterior face 144 such that the superior face 141 can rotate towards and away from the anterior face 143.

Figure 1:
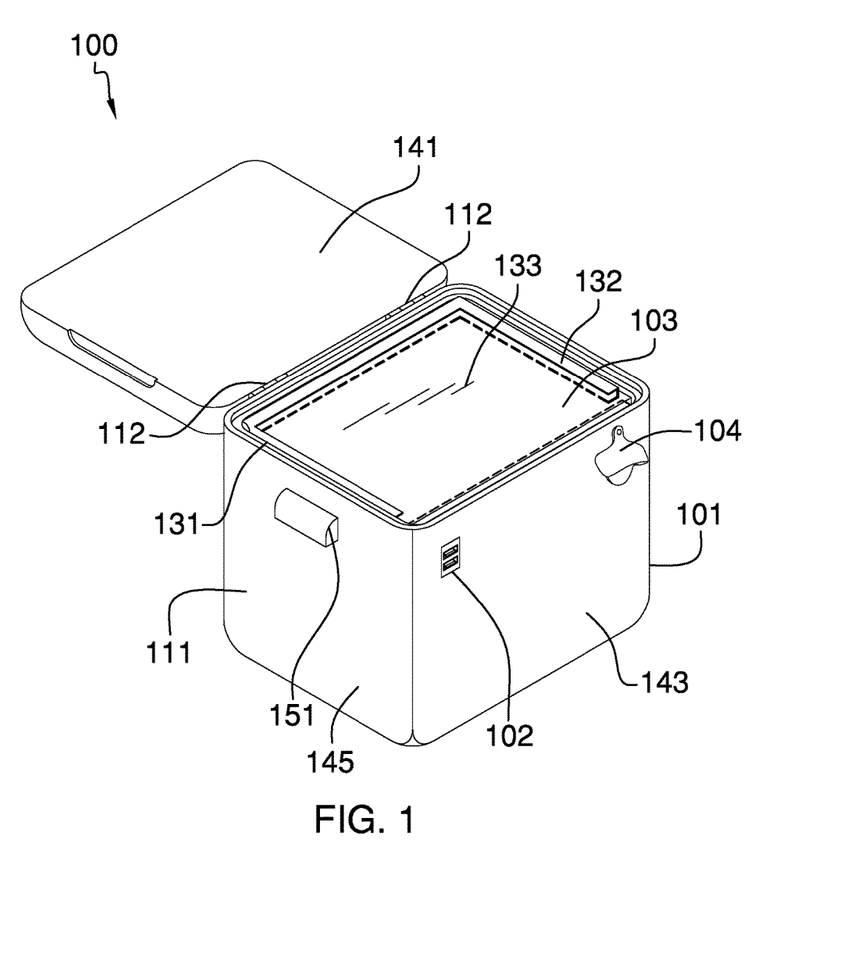
FIG. 1 is a perspective view of an embodiment of the disclosure.
Figure 2:
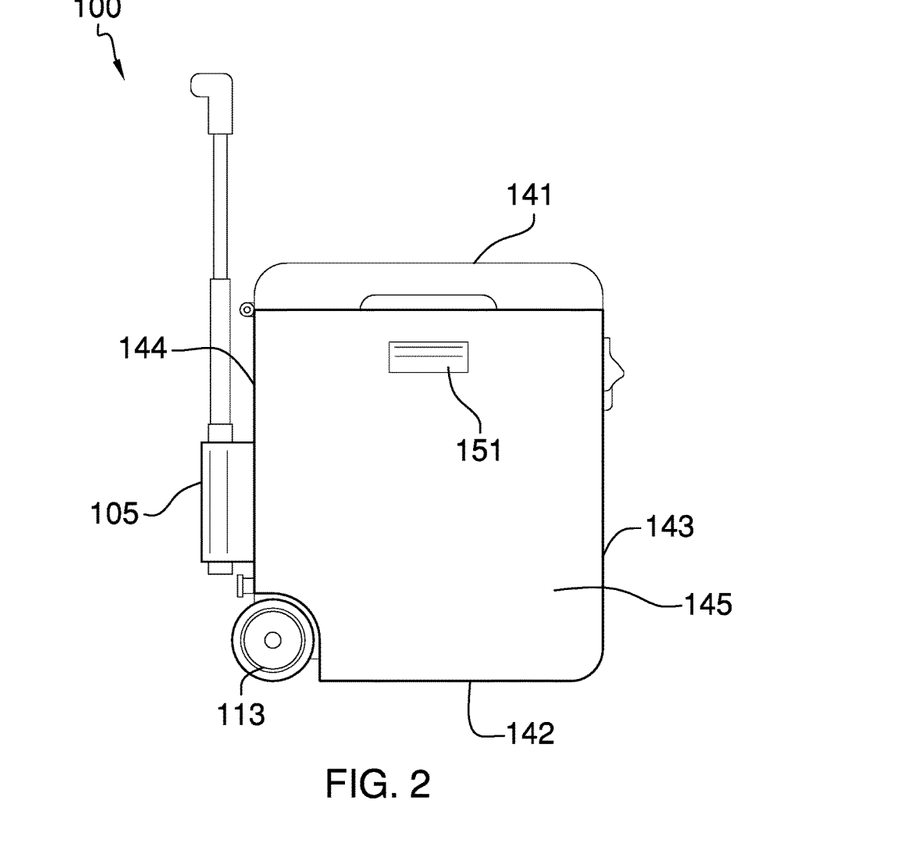
FIG. 2 is a side view of an embodiment of the disclosure.
Figure 3:
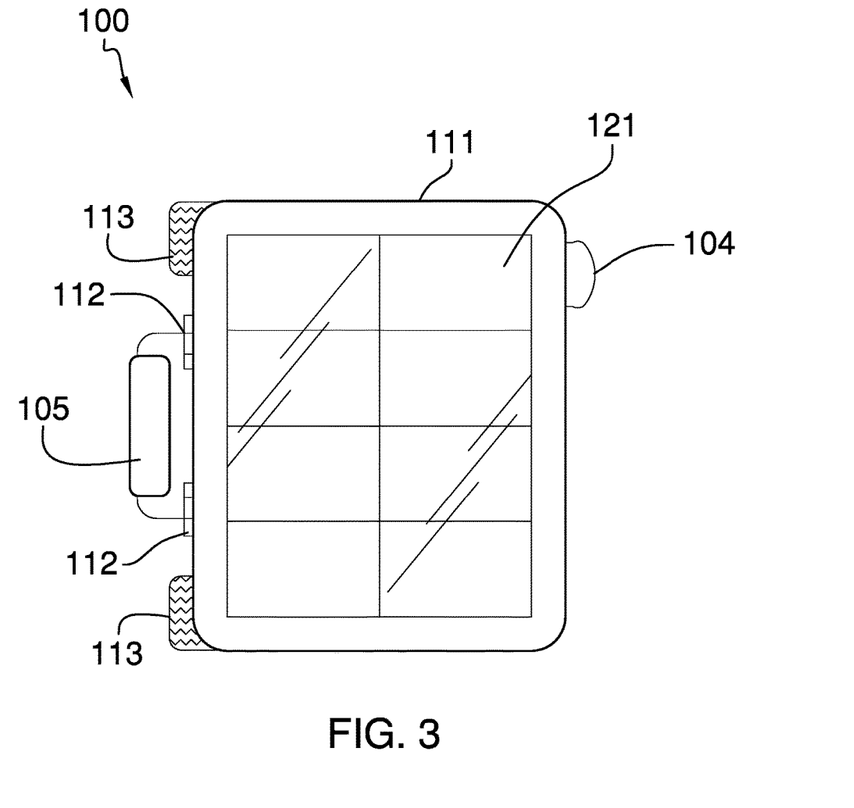
FIG. 3 is a top view of an embodiment of the disclosure.
Figure 4:
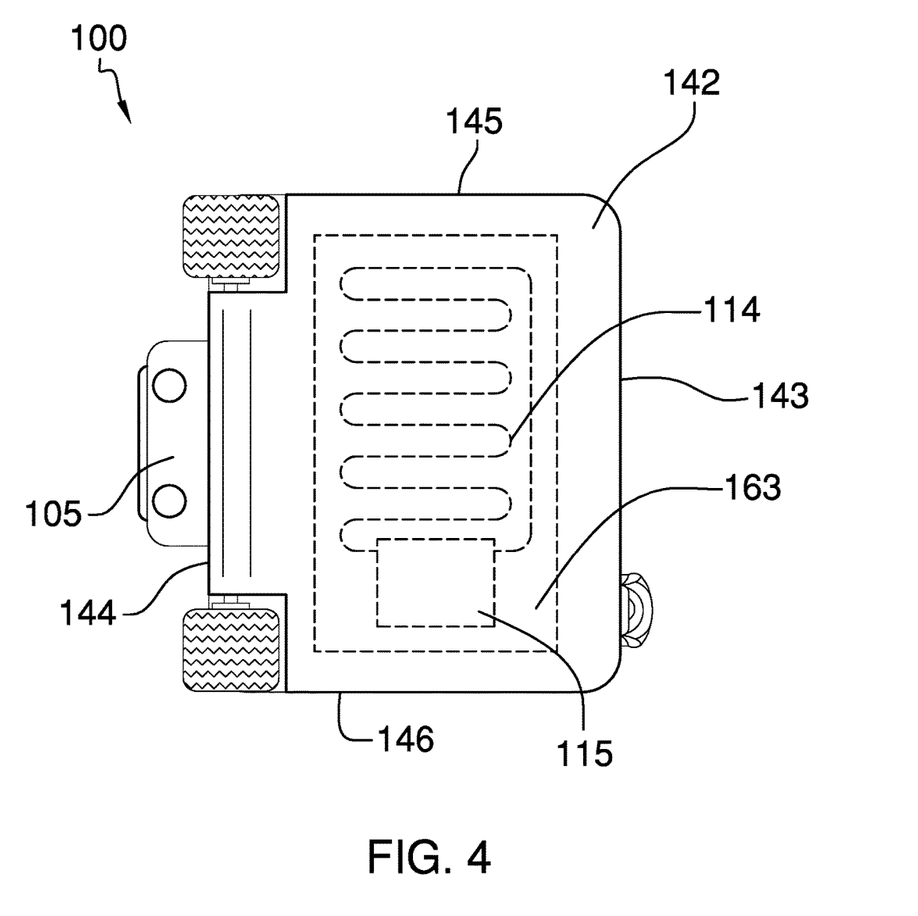
FIG. 4 is a bottom view of an embodiment of the disclosure.
Figure 5:
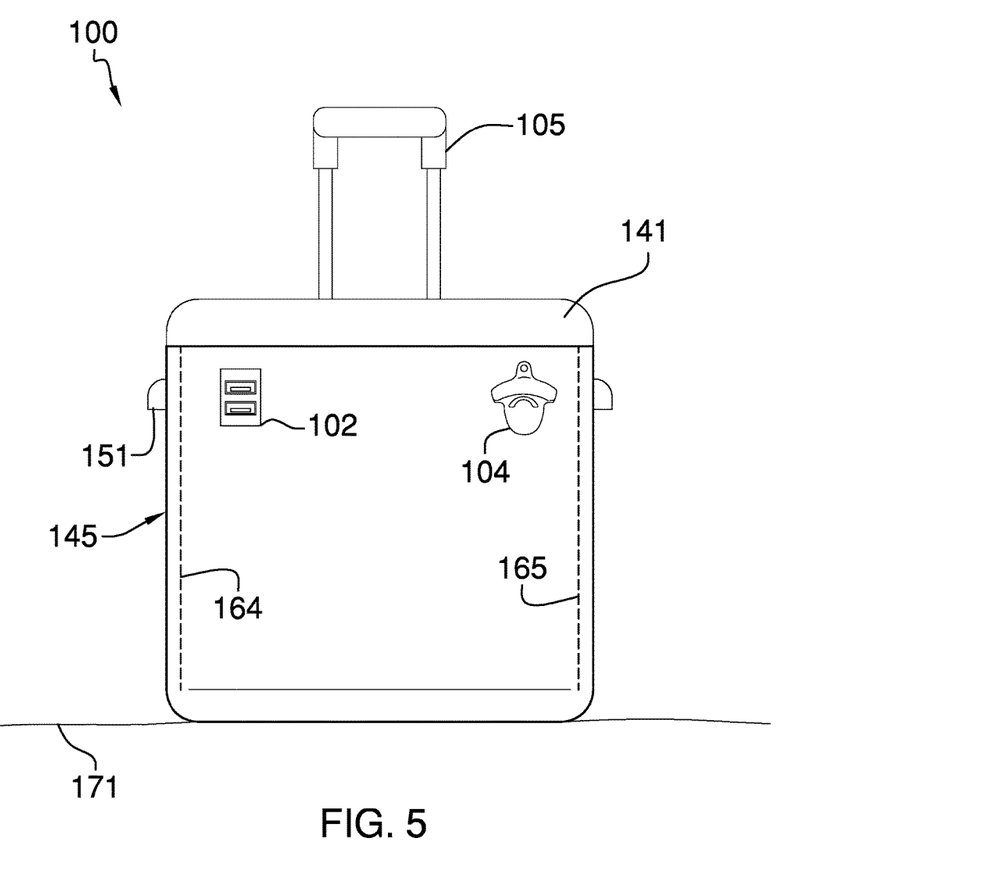
FIG. 5 is a front view of an embodiment of the disclosure.
Figure 6:
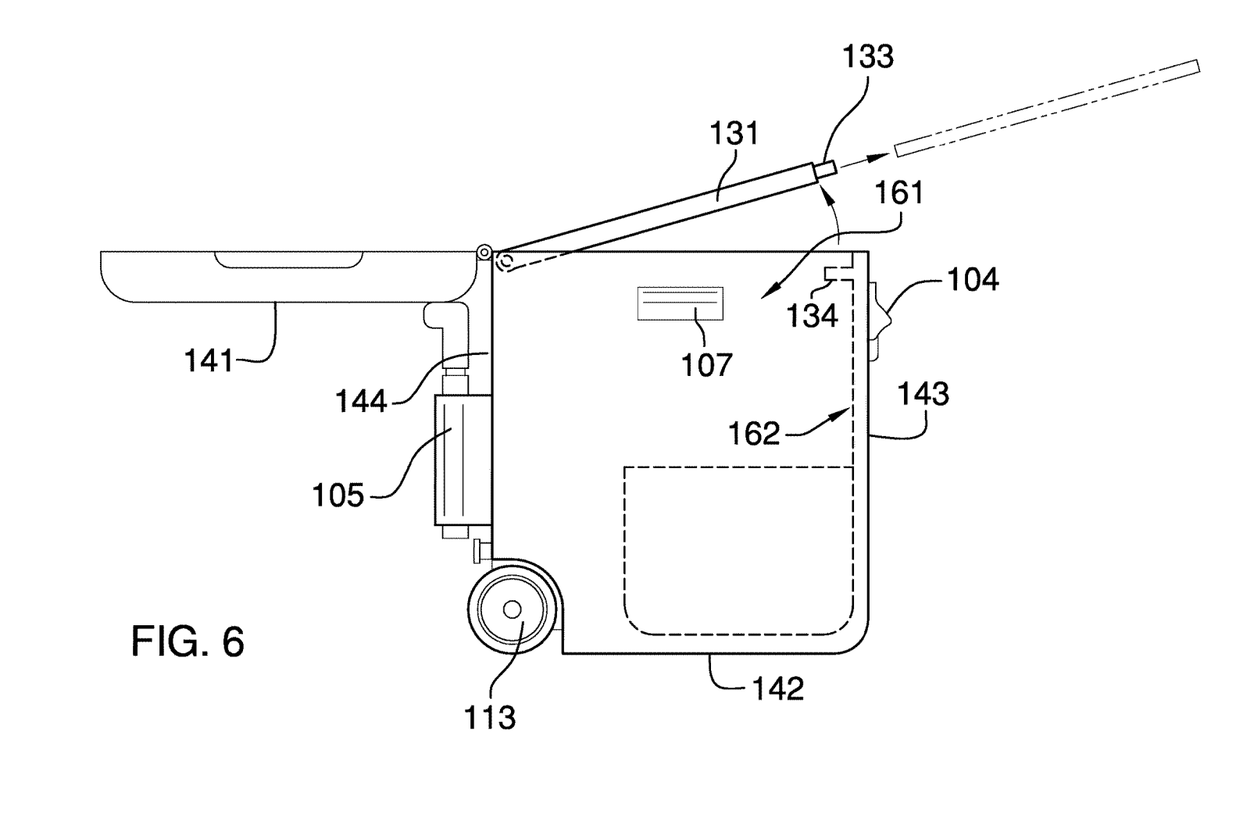
FIG. 6 is an in-use view of an embodiment of the disclosure.

As shown most clearly in FIGS. 4 and 6, a first wheel selected from the plurality of wheels 113 is mounted proximal to the position where the inferior face 142, the posterior face 144, and the left face 145 are joined. A second wheel selected from the plurality of wheels 113 is mounted proximal to the position where the inferior face 142, the posterior face 144, and the right face 146 are joined. In some potential embodiments of the disclosure, modifications to the rectangular block structure of the housing 111 may be made to streamline the look of the plurality of wheels 113 for decorative purposes. Such modifications can be made by those skilled in the mechanical and manufacturing arts without undue experimentation.

As shown most clearly in FIG. 6, the cutting board 103 is installed within the interior space 161 of the housing 111 such that the cutting board 103 is in an inferior position that is proximal to the superior face 141. The left track 131 attaches to the interior left surface 164 of the left face 145 such that the left track 131 rotates in a plane that is parallel to the interior left surface 164. The right track 132 attaches to the interior right surface 165 of the right face 146 such that the right track 132 rotates in a plane that is parallel to the interior right surface 165.

The board shelf 134 is formed on the interior anterior surface 162 of the anterior face 143 of the housing 111. The board shelf 134 is positioned such that: 1) the board shelf 134 limits the rotation of the left track 131 and the right track 132 to the superior side of the board shelf 134; and, 2) the board shelf 134 rotates in the direction towards the anterior face 143 such that the left track 131 and the right track 132 can rest upon the board shelf 134. The board shelf 134 is positioned such that the board shelf 134 projects perpendicularly away from the interior anterior surface 162 of the anterior face 143. The polyethylene panel 133 is inserted into both the left track 131 and the right track 132 for storage.

The left handle 151 is formed on the exterior surface of the left face 145. The right handle 152 is formed on the exterior surface of the right face 146.

Figure 7:
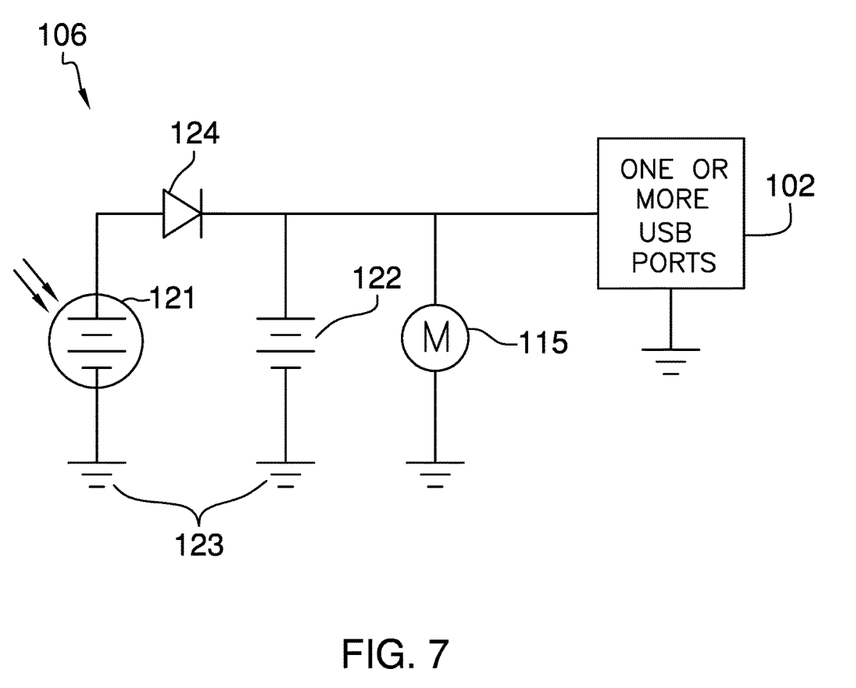
FIG. 7 is a schematic view of an embodiment of the disclosure.

As shown most clearly in FIG. 7, the battery 122, the compressor motor 115, and the one or more USB ports 102 are electrically connected in a parallel circuit. Methods to power devices with a battery 122 in a parallel circuit are well known and documented in the electrical arts.

The chemical energy stored within the battery 122 is renewed and restored through the use of the photovoltaic cell 121. The photovoltaic cell 121 forms an electrical circuit that reverses the polarity of the battery 122 and provides the energy necessary to reverse the chemical processes that the battery 122 initially used to generate the electrical energy. This reversal of the chemical process creates a chemical potential energy that will later be used to generate electricity. The photovoltaic cell 121 is installed on the exterior surface of the superior face 141.

The diode 124 is installed such that the diode 124 prevents the flow of electrical energy from the battery 122 to the photovoltaic cell 121.

The following definitions were used in this disclosure:

Anterior: As used in this disclosure, anterior is a term that is used to refer to the front side or direction of an object. When comparing two objects, the anterior object is the object that is closer to front of the object.

Battery: As used in this disclosure, a battery is a container consisting of one or more cells, in which chemical energy is converted into electricity and used as a source of power.

Decorative: As used in this disclosure, the term decorative is used to describe a design decision or feature that is not anticipated to materially affect the novelty of the innovation described in this disclosure.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy.

Electrical Ground: As used in this disclosure, an electrical ground is a common reference voltage that is used in the design and implementation of electrical circuits. An electrical ground is often, but not necessarily, the discharge point of electric currents flowing through an electric circuit.

Exterior: As used in this disclosure, the exterior is use as a relational term that implies that an object is not contained within the boundary of a structure or a space.

Grip: As used in this disclosure, a grip is an accommodation formed within an object that allows the object to be grasped by a hand.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interior: As used in this disclosure, the interior is use as a relational term that implies that an object is contained within the boundary of a structure or a space.

Motor: As used in this disclosure, a motor refers to the method of transferring energy from an external power source into mechanical energy.

Negative Space: As used in this disclosure, negative space is a method of defining an object through the use of open or empty space as the definition of the object itself, or, through the use of open or empty space to describe the boundaries of an object.

Personal Data Device: As used in this disclosure, a personal data device is a handheld device that is used for managing personal information and communication. Examples of personal data device include, but are not limited to, cellular phones, tablets and smart phones.

Photovoltaic Cell: As used in this disclosure, a photovoltaic cell is an electrical device that directly converts light energy into electrical energy.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the front of the object.

Pump: As used in this disclosure, a pump is a mechanical device that uses suction or pressure to raise or move fluids, compress fluids, or force a fluid into an inflatable object.

Rectangular Block: As used in this disclosure, a rectangular block refers to a three dimensional structure comprising six rectangular surfaces formed at right angles. Within this disclosure, a rectangular block may further comprise rounded edges and corners.

Rim: As used in this disclosure, a rim is an edge or border that follows along the perimeter of an object.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A refrigerated apparatus comprising:
   a refrigeration system, one or more USB ports, a cutting board, a bottle opener, an extendable handle, and a power system;
   wherein the refrigerated apparatus is an insulated container;
   wherein the refrigerated apparatus comprises an interior space;
   wherein the interior forms a temperature controlled space;
   wherein the interior space is formed in the refrigeration system;
   wherein the refrigeration system cools the interior space of the refrigerated apparatus;
   wherein the refrigeration system is solar-powered;
   wherein the one or more ports, the cutting board, the bottle opener, the extendable handle, and a power system are mounted on the refrigeration system;
   wherein the refrigeration system comprises a housing, one or more hinges, a plurality of wheels, and a refrigeration device;
   wherein the housing, the one or more hinges, the plurality of wheels and the refrigeration device are mounted on the housing;
   wherein the housing is a hollow rectangular block structure;
   wherein the housing contains the interior space;
   wherein the housing is further defined with a superior face, an inferior face, an anterior face, a posterior face, a left face, and a right face;
   wherein each of the one or more hinges is a pivot around which the superior face rotates;
   wherein each of the plurality of wheels attach to the housing.

2. The refrigerated apparatus according to claim 1
   wherein the refrigeration device is a mechanical implementation of a Carnot cycle;
   wherein the refrigeration device further comprises a compressor motor;
   wherein the housing contains the interior space.

3. The refrigerated apparatus according to claim 2 wherein the compressor motor is an electrically powered pump.

4. The refrigerated apparatus according to claim 3
   wherein the superior face is formed as an insulating structure;
   wherein the superior face forms the superior surface of the refrigerated apparatus;
   wherein the superior face rotates to provide access to the interior space.

5. The refrigerated apparatus according to claim 4
   wherein the inferior face is formed as an insulating structure;
   wherein the inferior face is the face of the housing that is distal from the superior face;
   wherein the inferior face is the face of the housing that is proximal to the supporting surface;
   wherein the inferior face is formed with a component space.

6. The refrigerated apparatus according to claim 5
   wherein the anterior face is formed as an insulating structure;
   wherein the anterior face is the face of the housing that leads the refrigerated apparatus when the refrigerated apparatus is moved using the plurality of wheels;
   wherein the anterior face is further defined with an interior anterior surface;
   wherein the interior anterior surface is the surface of the anterior face that is proximal to the interior space.

7. The refrigerated apparatus according to claim 6
   wherein the posterior face is formed as an insulating structure;
   wherein the posterior face is the face of the housing that is distal from the anterior face.

8. The refrigerated apparatus according to claim 7
   wherein the left face is formed as an insulating structure;
   wherein the left face further comprises a left handle;
   wherein the left handle is a grip that is formed in the left face;
   wherein the left face is further defined with an interior left surface;
   wherein the interior left surface is the surface of the left face that is proximal to the interior space.

9. The refrigerated apparatus according to claim 8
   wherein the right face is formed as an insulating structure;
   wherein the right face further comprises a right handle;
   wherein the right handle is a grip that is formed in the right face;

wherein the right face is further defined with an interior right surface;

wherein the interior right surface is the surface of the right face that is proximal to the interior space.

10. The refrigerated apparatus according to claim 9 wherein the component space is a rectangular block shaped negative space that is formed within the inferior face for the purpose of storing the refrigeration device and the power system with the exception of the photovoltaic cell.

11. The refrigerated apparatus according to claim 10
wherein the cutting board comprises a left track, a right track, a polyethylene panel, and a board shelf;
wherein the polyethylene panel forms a cutting surface;
wherein the left track, the right track, and a board shelf comprises an apparatus for storing the polyethylene panel.

12. The refrigerated apparatus according to claim 11
wherein the left track is a U-shaped bracket that is sized to receive an edge of the polyethylene panel;
wherein the right track is a U-shaped bracket that is sized to receive an edge of the polyethylene panel;
wherein the board shelf is a rectangular block structure.

13. The refrigerated apparatus according to claim 12
wherein each of the one or more ports is a port that provides electrical power;
wherein the extendable handle is a handle;
wherein the position of the extendable handle relative to the refrigeration system is adjustable.

14. The refrigerated apparatus according to claim 13
wherein the power system is a solar-powered electrical system that powers the one or more ports and the refrigeration device;
wherein the power system comprises a photovoltaic cell, a battery, an electrical ground, and a diode;
wherein the photovoltaic cell, the battery, the diode, and the electrical ground are electrically interconnected.

15. The refrigerated apparatus according to claim 14
wherein the photovoltaic cell is an electrical device that converts light into electrical energy;
wherein the battery is a chemical device that converts chemical energy into electrical energy;
wherein the battery is rechargeable;
wherein the diode is an electrical device;
wherein the electrical ground is a voltage reference;
wherein the left handle is formed on the exterior surface of the left face;
wherein a right handle is formed on the exterior surface of the right face.

16. The refrigerated apparatus according to claim 15
wherein each of the one or more ports is mounted on the exterior surface of the anterior face of the housing;
wherein the bottle opener is mounted on the exterior surface of the anterior face of the housing;
wherein the extendable handle is mounted on the exterior surface of the posterior face of the housing such that the extendable handle extends in the superior direction when the refrigerated apparatus rests on a supporting surface;
wherein each of the one or more hinges attaches the superior face to the posterior face such that the superior face can rotate towards and away from the anterior face;
wherein a first wheel selected from the plurality of wheels is mounted proximal to the position where the inferior face, the posterior face, and the left face are joined;
wherein a second wheel selected from the plurality of wheels is mounted proximal to the position where the inferior face, the posterior face, and the right face are joined.

17. The refrigerated apparatus according to claim 16
wherein the cutting board is installed within the interior space of the housing such that the cutting board is in an inferior position that is proximal to the superior face;
wherein the left track attaches to the interior left surface of the left face such that the left track rotates in a plane that is parallel to the interior left surface;
wherein the right track attaches to the interior right surface of the right face such that the right track rotates in a plane that is parallel to the interior right surface;
wherein the board shelf is formed on the interior anterior surface of the anterior face of the housing;
wherein the board shelf is positioned such that the board shelf limits the rotation of the left track and the right track to the superior side of the board shelf;
wherein the board shelf is positioned such that the board shelf rotates in the direction towards the anterior face such that the left track and the right track can rest upon the board shelf;
wherein the board shelf is positioned such that the board shelf projects perpendicularly away from the interior anterior surface of the anterior face;
wherein the polyethylene panel is inserted into both the left track and the right track for storage.

18. The refrigerated apparatus according to claim 17
wherein the battery, the compressor motor, and the one or more USB ports are electrically connected in a parallel circuit;
wherein the chemical energy stored within the battery is renewed and restored through the use of the photovoltaic cell;
wherein the photovoltaic cell forms an electrical circuit that reverses the polarity of the battery;
wherein the photovoltaic cell is installed on the exterior surface of the superior face;
wherein the diode is installed such that the diode prevents the flow of electrical energy from the battery to the photovoltaic cell.

\* \* \* \* \*